United States Patent
Uskert

(10) Patent No.: US 9,143,023 B1
(45) Date of Patent: Sep. 22, 2015

(54) ELECTROMAGNETIC PROPULSIVE MOTOR

(76) Inventor: Richard Christopher Uskert, Nobelsville, IN (US)

(*) Notice: Subject to any disclaimer, the term of this patent is extended or adjusted under 35 U.S.C. 154(b) by 319 days.

(21) Appl. No.: 13/109,711

(22) Filed: May 17, 2011

Related U.S. Application Data

(60) Provisional application No. 61/345,412, filed on May 17, 2010.

(51) Int. Cl.
*H02K 16/04* (2006.01)
*H02K 16/00* (2006.01)

(52) U.S. Cl.
CPC .............. *H02K 16/00* (2013.01); *H02K 16/04* (2013.01)

(58) Field of Classification Search
CPC .............................. H02K 16/00; H02K 16/04
USPC ........ 310/67 R; 417/356, 423.1, 423.5, 423.7
See application file for complete search history.

(56) References Cited

U.S. PATENT DOCUMENTS

| | | | | |
|---|---|---|---|---|
| 4,289,970 A | * | 9/1981 | Deibert | 290/44 |
| 5,220,231 A | * | 6/1993 | Veronesi et al. | 310/90 |
| 5,474,429 A | * | 12/1995 | Heidelberg et al. | 417/356 |
| 5,607,329 A | * | 3/1997 | Cho et al. | 440/6 |
| 5,735,671 A | * | 4/1998 | Brauer et al. | 416/95 |
| 6,225,715 B1 | * | 5/2001 | Hoda et al. | 310/67 R |
| 7,952,244 B2 | * | 5/2011 | Colin | 310/67 R |
| 2008/0175703 A1 | * | 7/2008 | Lugg | 415/66 |

* cited by examiner

*Primary Examiner* — Dang Le
(74) *Attorney, Agent, or Firm* — Middleton Reutlinger; Alexander P. Brackett

(57) ABSTRACT

The invention provides an electromagnetic propulsive motor having a rotor capable of rotation around a shaft and having a plurality of radially disposed blades including blade tip portions for compressing a working fluid. The invention further provides a stator having a case frame, and a plurality of radially disposed vanes extending generally between said case frame and said shaft for directing the working fluid. A plurality of electromagnetic elements disposed within said rotor blades proximate the tip portions thereof interact electromagnetically with a plurality of electromagnetic elements disposed in said stator case frame to drive said rotor.

15 Claims, 12 Drawing Sheets

ELECTROMAGNETIC PROPULSIVE MOTOR

CROSS-REFERENCE TO RELATED APPLICATIONS

The present application claims the benefit (under 35 U.S.C. §119(e)) of U.S. Provisional Patent Application Ser. No. 61/345,412 filed May 17, 2010, and entitled "Electromagnetic Propulsive Motor".

FIELD OF THE INVENTION

The present invention relates generally to aircraft propulsion systems, and more particularly to an electromagnetically driven compressive ducted fan propulsion system, herein referred to as an electromagnetic propulsive motor.

BACKGROUND OF THE INVENTION

Prior art gas turbine engines often employ a fan to draw in a working fluid, typically air, a compressor to compress the working fluid entering the engine, a combustor to burn the compressed air mixed with fuel, and a turbine that extracts work from the working fluid exiting the engine. Each of the aforementioned engine sections is typically comprised of one or more stages of rotating blades and concomitant vanes to direct the working fluid and extract work from the hot combusted gases in order to drive the compressor and fan, thus providing an exhaust gas stream of high velocity ("jet") to generate a propulsive force typically employed in aircraft flight.

Known gas turbine engines produce large amounts of thrust but are typically costly to operate and manufacture due to the necessity to burn large quantities of jet fuel to drive the turbine. Additionally, the pollutants produced as a byproduct of jet fuel combustion are undesirable. Since the gas passing through the engine aft of the combustor is quite hot, all engine components are subjected to tremendous heat. Furthermore, the rotating components of a gas turbine engine have very high rotational velocities, that, when coupled with thermal expansion and impacts caused by normal engine operation cause them to rub or interfere with the static portions of the turbine. These inherent features of modern gas turbines render them quite costly to produce, as all components must be produced to extremely tight tolerances and be capable of withstanding enormous thermal and mechanical stresses.

Additionally, many prior art rotor and stator assemblies are quite complex, having a multiplicity of parts required to render the assembly capable of containing a high-pressure air stream and operate under a wide variety of power, speed, and atmospheric conditions. The cost and complexity of designing and constructing such prior art assemblies is quite prohibitive.

The present invention provides an improvement to the prior art by replacing the combustor and turbine of a conventional gas turbine engine with one or more electromagnetically driven compressive stages in order to provide the high velocity gas stream for propulsion while enhancing the operating efficiency of the propulsion system.

SUMMARY OF THE INVENTION

The present invention provides an electromagnetic propulsive motor for an aircraft or other vehicle. The motor may include metallic, ceramic and/or composite rotor and stator structures as components of at least one rotor stage and a stator. The motor of the present invention utilizes a novel stator design having a stator case frame incorporating a plurality of electromagnetic drives secured thereto for interaction with a plurality of rotor stages equipped for electromagnetic interaction with said stator.

A rotor stage, or a plurality thereof, utilizes a plurality of novel rotor blades, each comprising a magnetic or electromagnetic element disposed at a radially outward portion of the blades to interact with the electromagnetic elements positioned in the stator case frame. As the rotor blades spin around a central axial shaft, the electromagnetic elements positioned on the rotor blades alternately repulse and attract complementary elements positioned on the stator case frame.

A controller is provided to supply a plurality of output signals to energize the electromagnetic elements. By timing the field polarity and strength of the field created by the electromagnetic elements, the rotor stages can be driven at any required speed or power output level desired.

The principles and concepts embodied in the present invention may also be employed with a turbofan engine, for example a bypass fan motor configuration. Furthermore, the rotor/stator electromagnetic element interaction can be utilized as a generator of electrical power where the rotor is spinning freely and is not required to be driven.

Additionally, the present invention comprises a plurality of rotor blade configurations, each including a magnetic or electromagnetic element positioned to interact with a concomitant stator-mounted element. Where blades incorporate electromagnetic elements, the winding leads required to supply an energizing current to said electromagnetic elements may be routed through the interior of the rotor blades, and out through a brush and contact assembly secured to a rotating rotor wheel.

Other features, objects, and advantages of the present invention will become readily apparent from the detailed description of the preferred embodiments taken in conjunction with the attached drawing Figures.

BRIEF DESCRIPTION OF THE DRAWING FIGURES

DETAILED DESCRIPTION OF THE PREFERRED EMBODIMENT(S)

Figure 1:
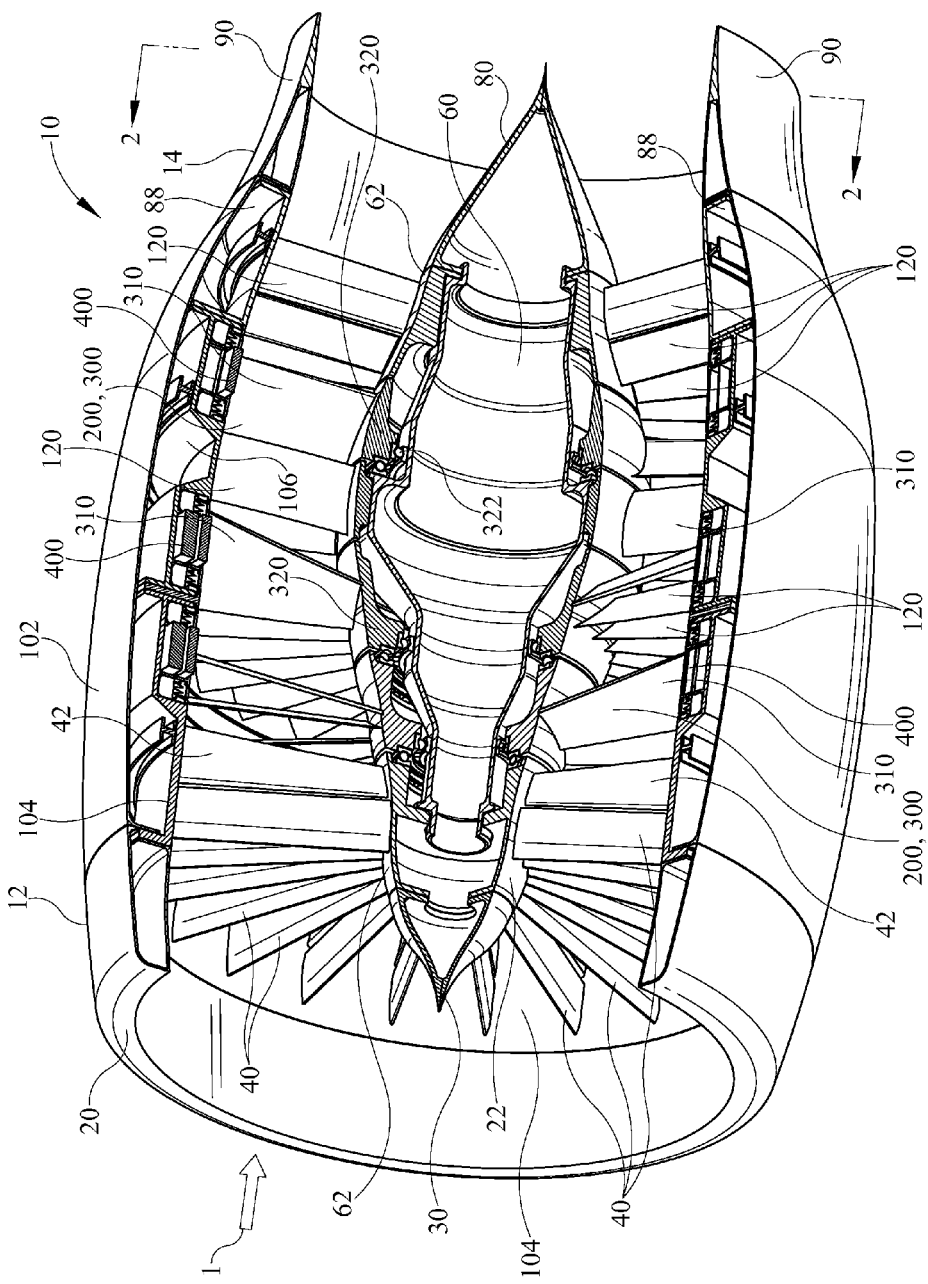
FIG. 1 is a partial cross-sectional perspective view of an axial electromagnetic propulsion motor in accordance with one embodiment of the present invention.

For the purpose of promoting an understanding of the principles of the invention described in the instant application reference will now be made to the embodiments illustrated in the drawing Figures, and specific language will be used to describe the same. It is nonetheless understood that no limitation of the scope of the invention is intended by the illustrations and descriptions of certain embodiments of the invention. Additionally, any alterations and/or modifications of the illustrated and/or described embodiment(s) are contemplated as being within the scope of the present invention. Furthermore, any other applications of the principles of the invention, as illustrated and/or described herein, as would normally occur to one skilled in the art to which the invention pertains, are contemplated as being within the scope of the present invention.

Referring now to the drawings and in particular FIG. 1, an exemplary depiction of an electromagnetic propulsive motor 10 in the form of an axial engine in accordance with one embodiment of the present invention, such as an aircraft propulsion engine, is depicted in partial cross-section to show the arrangement of portions of the interior of motor 10. Throughout this specification reference will be made to the term "airflow" through motor 10. It will be understood that the term "airflow" is synonymous with and inclusive of any fluid that is suitable for use in an axial motor 10.

Motor 10 can comprise an air intake case 20 through which entering air or fluid is directed, in the general direction of arrow 1. Intake case 20 is disposed at a forward portion or highlight 12 of motor 10, and is spaced circumferentially around a nose cone 30 to direct air through a plurality of radially extending inlet struts 40 and guide vanes 42 that direct entering airflow through motor 10. Inlet guide vanes 42 may be variable guide vanes 42 to more efficiently control and direct air into motor 10 at a plurality of operating speeds.

Motor 10 comprises a central axial shaft 60, shown in cross section in FIG. 1, having an exterior surface 62. Shaft 60 terminates in a diffuser or tail cone 80 that, in concert with a radially spaced nozzle 90 acts to expand compressed airflow 1 through an aft portion 14 of motor 10, thereby resulting in "jet" propulsion.

A stator 100 comprises a stator cowl 102 that defines the exterior surface of motor 10 and extends generally from inlet case 20 to an exit guide vane case 88 and nozzle 90, and further comprises an inlet case frame 104 and stator case frame 106. The inlet case 20, exit guide vane case 88, inlet case frame 104 and nozzle 90 generally define an outer airflow path through motor 10. Inlet guide struts 40 are secured at a radially outward end to stator cowl 102, and at a radially inward end to shaft 60. Similarly, inlet guide vanes 42 may be fixedly secured between shaft 60 and inlet case 20 frame 104. When variable inlet guide vanes 42 are utilized, the radially extending vanes 42 are rotatably mounted between an inlet case hub 22 secured to shaft 60 at a forward end thereof and inlet case 20 frame 104, so that they are capable of rotation about a generally radial axis with respect to shaft 60. Variable inlet guide vanes 42 may be positioned to direct airflow 1 by known control means without departing from the scope of the invention. It should be noted that in some motor 10 applications, wherein motor 10 is secured within an airframe of a plane or other structure, cowl 102 and highlight 10 may not be present.

Additionally, stator 100 comprises a plurality of fixed and variable vanes 120 for directing airflow that also extend radially between shaft 60 and stator case frame 106. Each of the static vanes 42, 120 are fixedly secured between stator case frame 106 or inlet case frame 104 and shaft 60 (or a hub secured around shaft 60), for transmitting and resisting static and dynamic forces generated by the operation, movement and handling of motor 10.

Still referring to FIG. 1, a rotor 200 comprises a plurality of rotating stages 300 extending generally radially between shaft 60 and stator case frame 106 that act to pressurize the airflow through motor 10 while vanes 42, 120 straighten and redirect the airflow through motor 10. Rotor stages 300 generally comprise a plurality of radial blades 310, extending between stator case frame 106 and shaft 60, each secured to a rotor wheel or hub 320 that is mounted for rotation on a bearing 322, or a plurality thereof, thereby permitting rotor wheel 320 to rotate freely around shaft 60, and thereby rotating blades 310.

Figure 2:
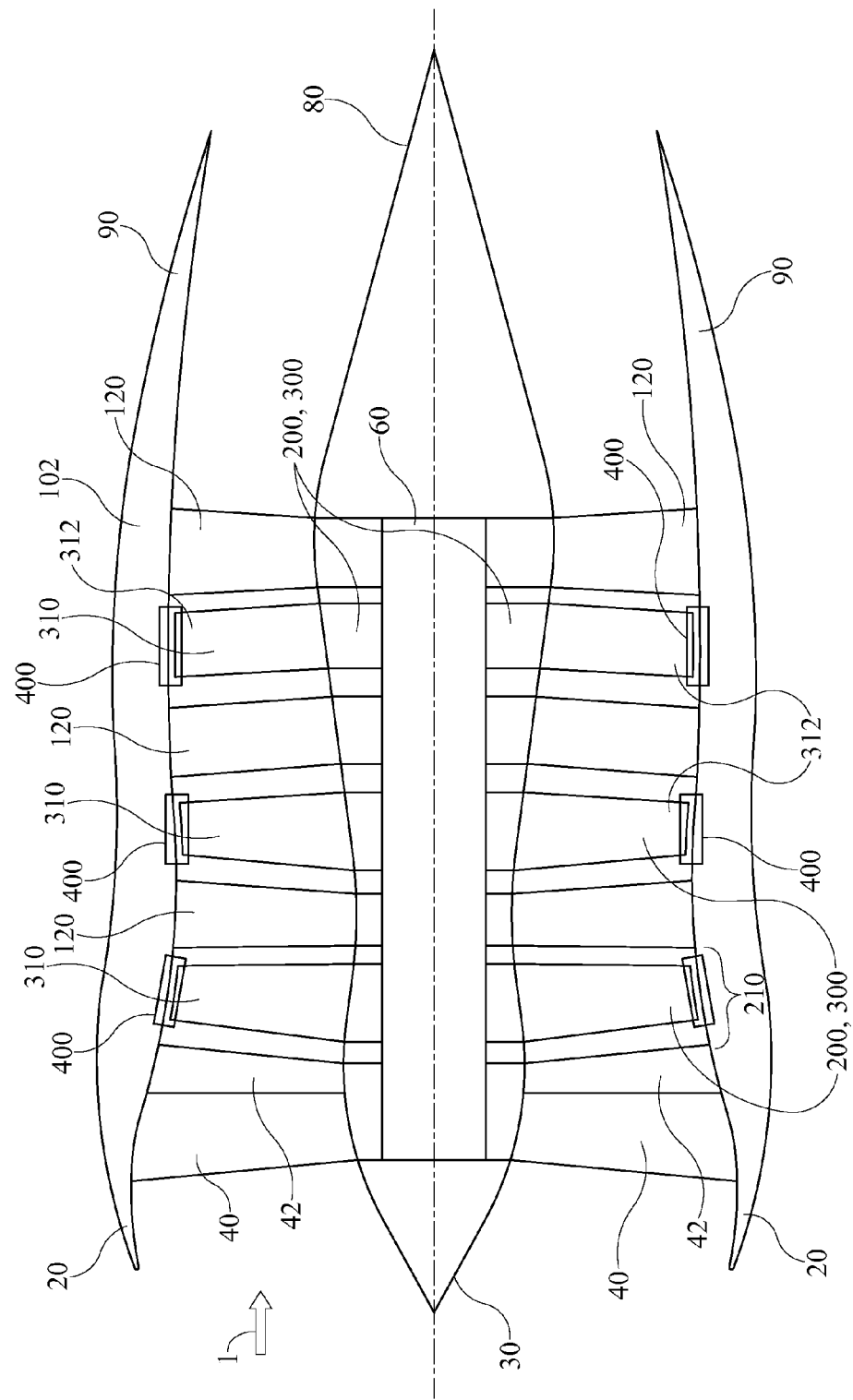
FIG. 2 is a cross-sectional schematic of an electromagnetic propulsive motor taken along the line 2-2 of FIG. 1 in accordance with one embodiment of the present invention.

As seen in FIGS. 1 and 2, and in accordance with an exemplary but non-limiting embodiment of the invention, electromagnetic proplusive motor 10 may comprise three rotor 200 stages 300, each rotatable about axial shaft 60. Although three rotor stages 300 are depicted, it will be understood that the present invention is not limited to any particular number of stages. Additionally, although FIG. 1 depicts a single shaft 60 motor 10, it will be understood to one of ordinary skill in the art that the present invention is equally applicable to multiple shaft turbine engine configurations.

Each rotor stage 300 comprises a plurality of blades 310 that rotate together. Each rotor 200 blade 310 further comprises a blade tip 312 that may include an enclosed electromagnetic element 400 therein. Similarly, stator case frame 106 may comprise a plurality of electromagnetic elements 400, mounted around the circumference of stator case frame 106 proximate blade 310 tip 312, thereby providing electromagnetic interaction between electromagnetic elements 400 mounted in stator case frame 106, and those encased in blade tips 312. Accordingly, by energizing stator case frame 106 mounted electromagnetic elements 400 and/or blade 310 elements 400, motor 10 operates as an electromagnetic propulsive motor 10, compressing working fluid and exhausting the compressed fluid, as will be discussed in greater detail herein below.

Figure 3:
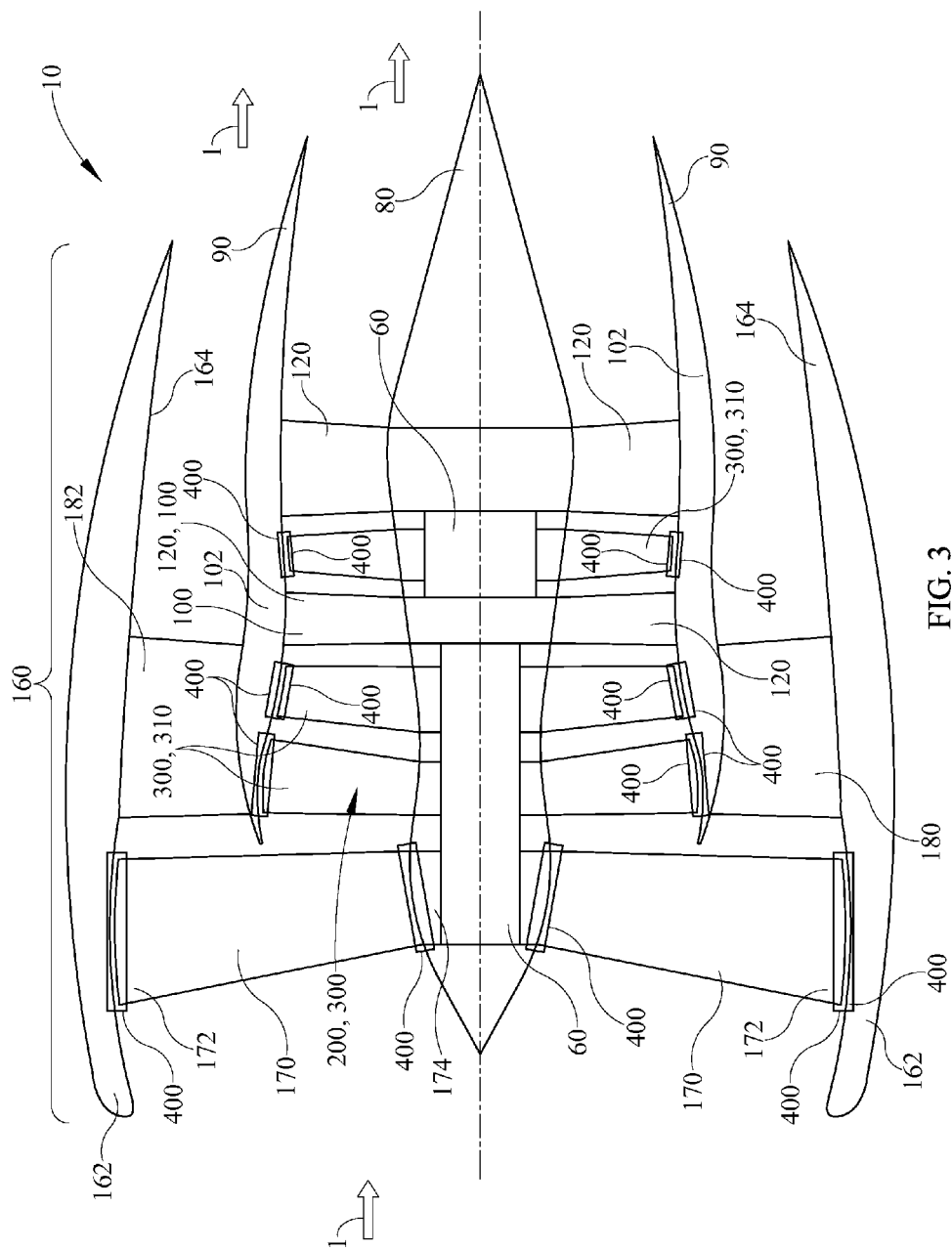
FIG. 3 is a cross-sectional schematic of an electromagnetic propulsive motor with a bypass fan in accordance with one embodiment of the present invention.

Referring now to FIG. 3, and in accordance with an exemplary non-limiting embodiment of the instant invention, an electromagnetic propulsive motor 10 may comprise a bypass fan 160 that includes a cowl 162 to intake and direct entering airflow 1 and a bypass duct 164 for directing airflow 1 exiting bypass fan 160. Bypass fan 160 includes a plurality of generally radially oriented fan blades 170 that are mounted for rotation around a first axial shaft 60. Fan blades 170 extend to a point proximate cowl 162 to maximize airflow 1 through motor 10. Bypass fan 160 may comprise a plurality of bypass guide vanes 180 fixedly mounted between bypass duct 164 and stator cowl 102 for directing airflow into rotor 200.

When operating, by-pass fan 160 draws airflow 1 through cowl 162 to be pressurized by fan blades 170. A portion of the air pressurized by fan 160 is directed into rotor 200 and stator 100 stages and the balance is directed through by-pass guide vanes 180 and into by-pass duct 164, which additionally provides a component of the thrust output by electromagnetic propulsive motor 10.

Fan blades 170 of bypass fan 160 may also comprise a blade tip 172 that encases an electromagnetic element 400, as well as a fan blade wheel 174 proximate first axial shaft 60, that are positioned to rotate past complementary electromagnetic elements 400 mounted in cowl 162 and shaft 60. In this embodiment of the invention, the complementary electromagnetic elements 400 drive bypass fan 160 from both its inner and outer periphery as complementary electromagnetic elements 400 attract and/repulse each other as bypass fan 162 rotates. Furthermore, any stage of motor 10 may be driven in this fashion, from both the inner and outer periphery.

Additionally, although the present embodiments of the invention 10 described and disclosed herein are axial and bypass engine configurations, it will be understood that the present invention is equally applicable to other engine configurations, for example, multiple bypass ducts and open-fan or rotor with axial engine configurations as well as centrifugal compressor configurations.

Again referring to FIG. 3, rotor 200 comprises two stages 300 of rotor blades 310 mounted for rotation around first axial shaft 60, and a third stage 300 of blades 310 mounted for rotation around a second, aft axial shaft 60, with a concomitant plurality of stator vanes 120 therebetween. It should be noted that each rotor 200 stage 300 rotates independently, since each set or stage 300 of blades 310 is capable of independent rotation around either first or second axial shafts 60. This feature of the present invention provides the ability to operate counter-rotating rotor 200 stages 300.

Rotation of the rotor blades 310 and wheel 320 are achieved by the attractive and/or repulsive forces of electromagnetic elements 400 and/or permanent magnets located at the outer and inner periphery of rotor blade 310 or wheel 320. The rotational velocity of rotor 200 is thus controlled by the strength of the attractive and/or repulsive forces between electromagnetic elements 400 and/or permanent magnets.

Figure 4:
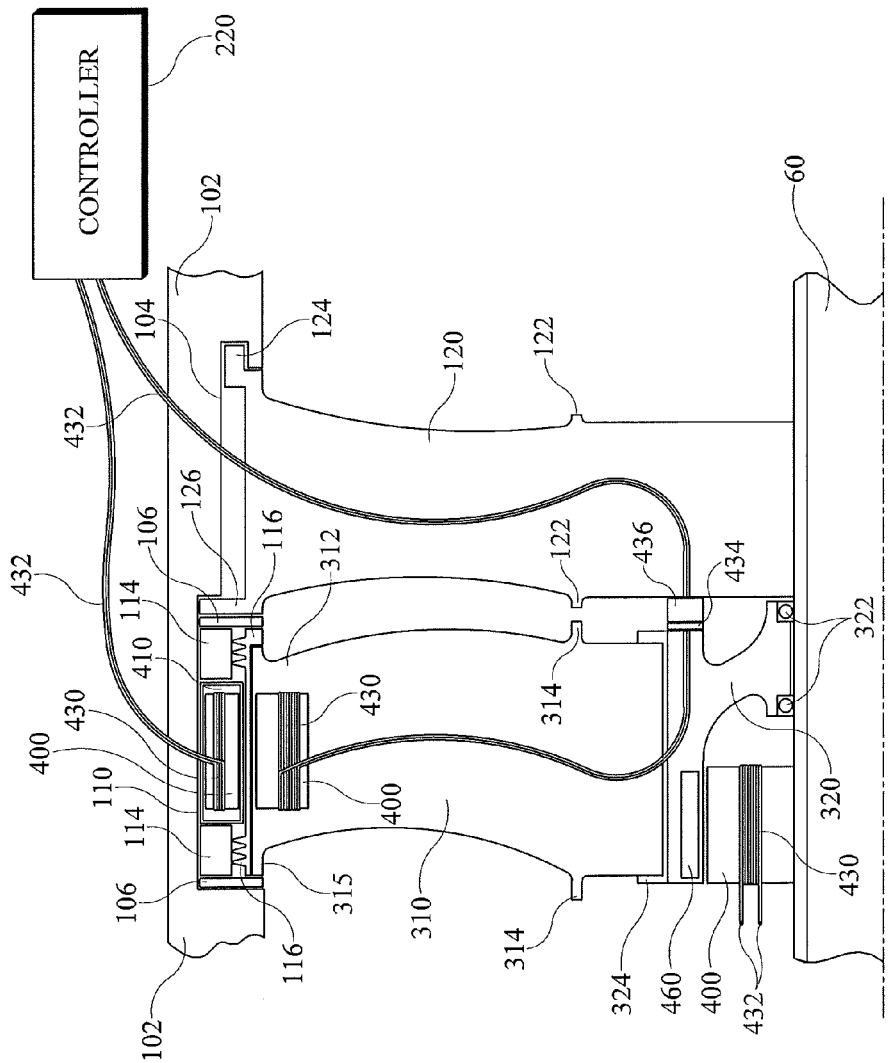
FIG. 4 is a cross-sectional detail view of a rotor blade and vane stage in accordance with an embodiment of the invention.

Referring now to FIG. 4, and in accordance with an exemplary non-limiting embodiment of the invention, a cross-sectional view of a rotor blade 310 depicts a plurality of electromagnetic elements 400 secured at various points to rotor blade 310, rotor wheel 320, stator case frame 106 and axial shaft 60. Electromagnetic elements 400 may comprise a magnetic material 420, such as one of a plurality of magnetic materials commonly employed in the production of electromagnets, as well as a electrically conductive windings 430 that are used to conduct an electrical current supplied by, for example, a controller 220, thereby generating an electromagnetic field to drive rotor blades 310 around shaft 60.

Rotor blade 310 may also include a blade platform 314 that extends outwardly around blade 310, generally orthogonal to a longitudinal axis of blade 310. Blade platform 314 defines an inner airflow path through motor 10. Additionally vane 120 may also comprise a vane platform 122 in an analogous manner to blade platform 314.

Rotor wheel 320 is rotatably mounted to axial shaft 60 by operation of a plurality of bearings 322 disposed between rotor wheel 320 and axial shaft 60. A leading edge 126 of vane 120, at the radially outward end, abuts an aft rub ring 106 which is capable of absorbing contact with the aft, radially outward edge of rotor blades 310 caused by axial impacts or undue vibration in rotor 200.

In the embodiment of the invention shown in FIG. 4, stator case frame 106 comprises a recessed area 110 shaped to accommodate an electromagnetic drive housing 410, that encloses an electromagnetic element 400 within case frame 106, proximate rotor blade tips 312. Electromagnetic element 400 includes windings 430 terminating in a pair of leads 432 that are routed to controller 220 that supplies a voltage/current signal to windings 430 to induce an electromagnetic field of a desired strength and orientation in electromagnetic element 400.

Recessed area 110 in which electromagnetic element housing 410 is encased further contains forward and aft static seals 114 on the forward and aft edges of housing 410. Additionally, each rotor blade 310 tip may further comprise forward and aft labyrinth seals 116, also disposed on the forward and aft edges of blade tips 312. Labyrinth seals 116 and static seals 114 work in concert to prevent the escape of high pressure airflow 1 from rotor 20, thereby ensuring high-efficiency operation of motor 10, as well as protecting electromagnetic elements 400.

Finally, at a forward edge of recessed area 110 is disposed a forward rub ring 106 that operates to absorb and dampen any contact between a leading edge 315 of rotor blade 310 and forward rub ring 106 caused by axial movement or vibration of rotor 200.

The embodiment of the invention depicted in FIG. 4 further comprises a magnetic element 460 secured to a radially inward portion of rotor wheel 320 that is mounted in proximity to a complementary electromagnetic element 400 mounted either on shaft 60 or on vane 120 forward of blade 310, or on any other static structure in motor 10 proximate the radially inward portion of rotor wheel 320.

Taken together, magnetic element 460 and shaft-mounted electromagnetic element comprise an inner electromagnetic drive. Similarly, housing 410 mounted electromagnetic element 400 and blade tip 312 encased electromagnetic 400 comprise an outer electromagnetic drive. Furthermore, tip 312 encased electromagnetic element 400 has winding 430 leads 432 that are routed through internal passages in blade 310 and rotor wheel 320, as will be discussed in greater detail below. Leads 432 may terminate in a contact 434 secured to rotor wheel 320, shown here at an aft edge thereof.

A concomitant brush contact 436 is secured to vane 120 at a point in close enough proximity to rotor wheel 320 that an electrical signal supplied to tip-encased electromagnetic element 400 may be transmitted through stator-mounted brush contact 436 from a controller 220, which controls the timing, voltage, current and duration of electrical signals to electromagnetic elements 400, thereby controlling electromagnetic fields produced thereby, and ultimately rotor 200 speed. Contacts 434 communicate actuation signals from the controller 220 to blade 310 mounted electromagnetic elements 400 through brush 436 via intimate contact. The timing of the signals between the brush and contacts is controlled by the segmentation of either or both of brushes 436 and contacts 434. This timing may also be accomplished through a hall effect, optical or other electrical switching system integral to controller 220.

In a yet further embodiment of the invention, controller 220 does not supply a signal to energize electromagnetic element 400, but rather accepts as a signal input the current induced in blade 310 mounted electromagnetic elements 400 from concomitant stator case frame 106 mounted electromagnetic elements 400 as they pass in close proximity to one another. In this exemplary embodiment of the instant invention controller 220 may determine, by both the timing, duration, and strength of the current signal received from blade 310 mounted electromagnetic elements 400, both the speed and approximate power output of rotor stage 300. This feature of the invention permits the performance of motor 10 to be closely monitored throughout various rotor stages 300 to tailor operation to specific power and speed requirements. In a yet further non-limiting embodiment of the present invention, rotor blades 310 may comprise a pair of tip 312 mounted electromagnetic elements 400, one of which is energized by controller 220 and one of which transmits an induced current signal thereto through brushes 436 and contacts 434.

Controller 220 may be utilized to determine and supply electrical signals of determined voltage, current and duration to electromagnetic elements 400 based upon a plurality of inputs for a desired propulsive effort. Controller 220 may be fixedly attached to stator cowl 102, stator case frame 106, or be separately mounted elsewhere. Additionally, controller 220 may be a conventional microcontroller having at least one processor, data memory, and having a plurality of inputs for receiving data from a propulsion system and aircraft and a plurality of outputs to send data and command signals to various components of the system described in the instant application.

Figure 5:
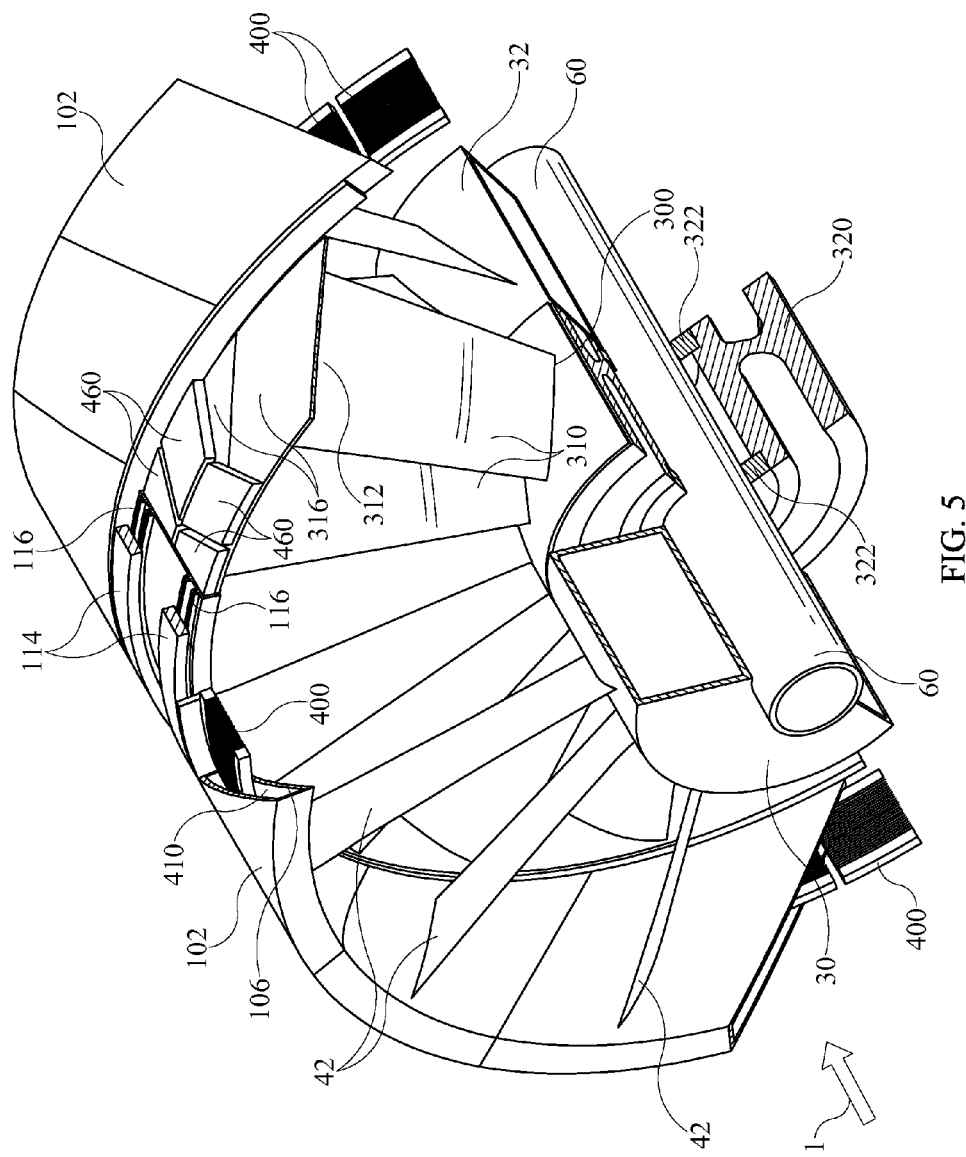
FIG. 5 is a partial cross-sectional perspective view of an axial electromagnetic propulsive motor in accordance with one embodiment of the present invention.

Referring now to FIG. 5 there is shown a partial cross-sectional perspective view of a rotor stage 300 in accordance with one exemplary embodiment of the present invention. An inlet guide vane 42 inner end wall housing 30 is secured around axial shaft 60, as is an exit guide vane 42 inner end wall housing 32. Guide vanes 42 are secured between end wall housings 30, 32 and stator case frame 106 to direct airflow 1 into rotor stage 300. Rotor wheel 320 is rotatable mounted to axial shaft 60 on bearings 322 and rotor blades 310 extend radially outwardly there from, as disclosed herein above.

In this embodiment of the invention rotor blade tips 312 comprise a platform or shroud 316 that extends circumferentially outwardly from blade tips 312, and closely mirrors the inner circumference of stator case frame 106. Shroud 316 includes a plurality of magnets 460 secured thereto for electromagnetic interaction with complementary electromagnetic elements 400. Furthermore, a plurality of electromagnetic elements 400 are secured in an electromagnetic housing 410 within stator case frame 106 both forward and aft of rotor stage 300. Electromagnetic elements 400 may be sequentially energized as rotor magnets 460 approach their edges to force rotor blade 310 to rotate, thereby driving rotor stage 300 and operating motor 10.

In this exemplary embodiment of the invention forward and aft mounted electromagnetic elements 400 secured to or in stator case frame 106 are in sufficient proximity to tip shroud 316 mounted magnets 460 to provide for electromagnetic interaction therebetween, subject to the electromagnetic field strength supplied by electromagnetic elements 400.

In a further embodiment of the invention in accordance with FIG. 5, controller 220 will periodically reverse the polarity of electromagnetic elements 400 at predetermined times such that permanent magnet 460 of rotor blades 310 are magnetically repulsed by their like fields, furthering the rotation of the blade stage 300. Thus the continuous and precisely timed field "switching" during the rotation of rotor 200 will operate to smoothly attract and then repulse the rotor magnetic elements 460 and stator electromagnetic elements 400 as rotor 200 rotates. Controller 220 may adjust the electromagnetic field switching, in both strength and duration, depending upon the operational characteristics of the propulsion system. Controller 220 may additionally operate in the above-described fashion where both rotor blades 310 and stator case frame 106 utilize electromagnetic elements 400, rather than permanent magnetic elements 460.

Figure 6:
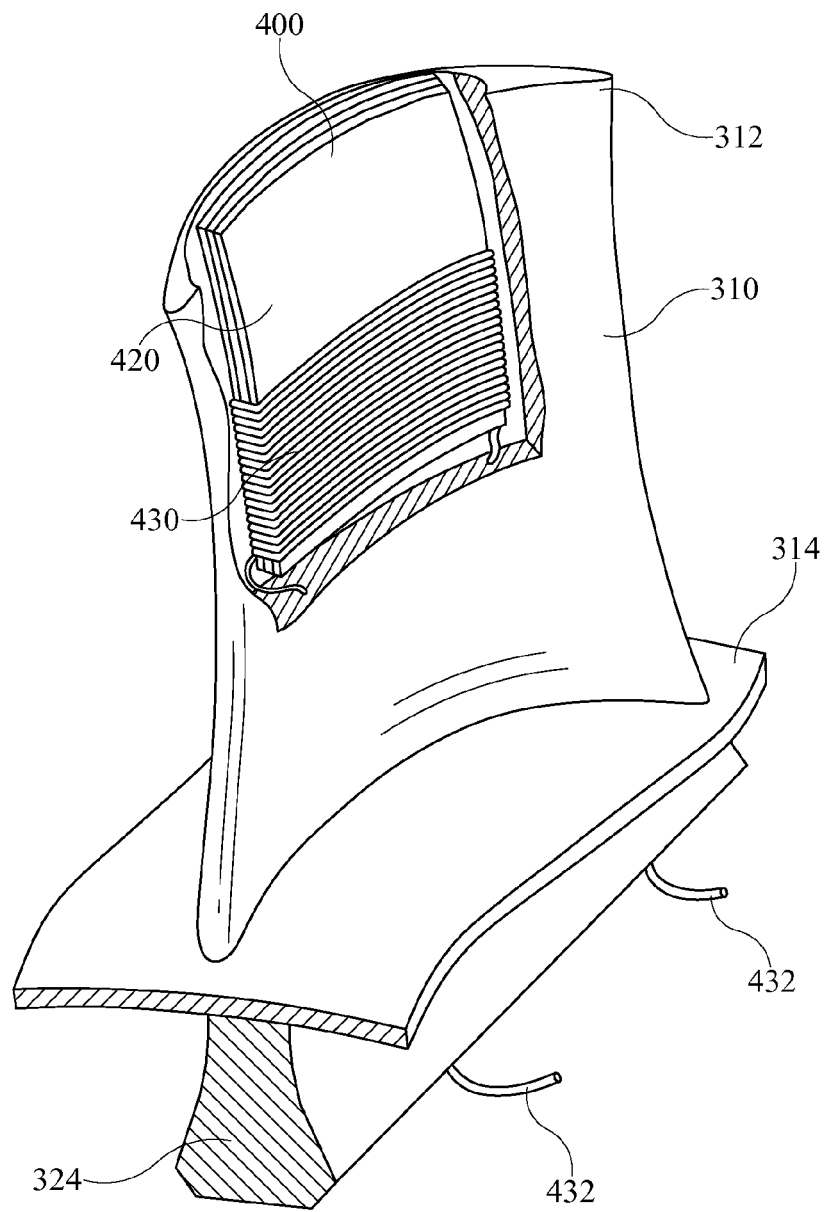
FIG. 6 is a perspective partial cross-sectional view of an electromagnetic rotor blade in accordance with an embodiment of the present invention.

Referring now to FIG. 6, and in accordance with a non-limiting embodiment of the invention a rotor blade 310 is shown in partial cross section having a blade-tip 312 that encases electromagnetic elements 400. Magnetic material 420 of element 400 is arranged generally vertically within blade 310. Leads 432 of windings 430 are routed through the interior of blade 310, blade platform 314 and dovetail 324 to exit blade 310 en route to controller 220. In this embodiment of the invention blade 310 electromagnetic elements 400 and concomitant leads are securely encased within the interior of blade 310 such that only leads 432 extend to the exterior thereof. This feature of the invention provides protection of electromagnetic elements 400 while still enabling electromagnetic interaction between rotor 200 and stator 100 mounted electromagnetic elements 400.

Figure 7:
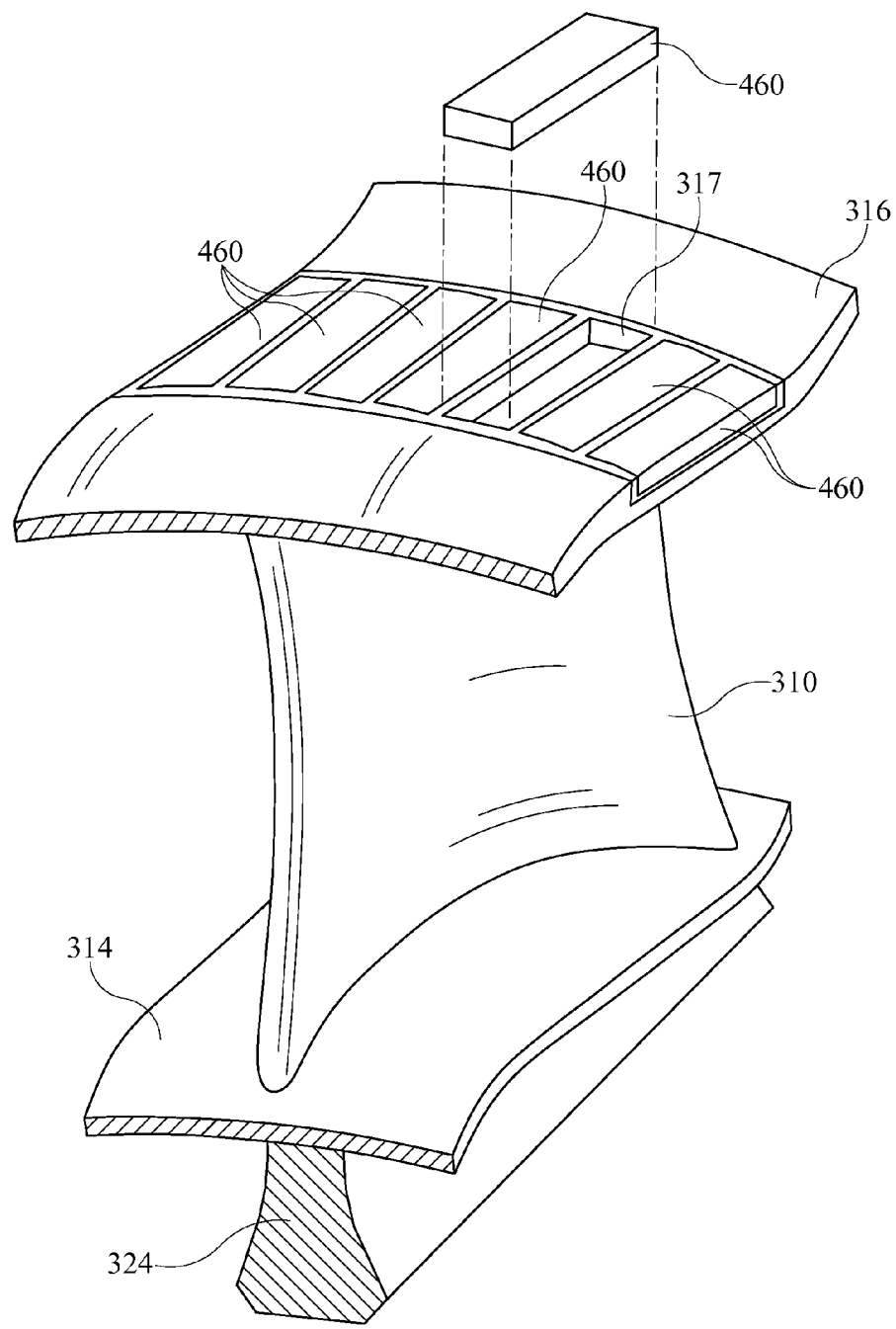
FIG. 7 is a perspective partial cross-sectional view of an electromagnetic rotor blade in accordance with an embodiment of the present invention.

FIG. 7 depicts an exemplary non-limiting embodiment of a rotor blade 310, similar to those depicted in FIG. 5, wherein a plurality of permanent magnets 460 are secured within a recess 317, or a plurality thereof, disposed in tip shroud 316 so that permanent magnets 460 do not extend radially outwardly past the top surface of tip shroud 316. Shroud 316 functions to contain and direct airflow 1 through motor 10, as well as provide a circumferential space for mounting magnets 460 as shown. Magnets 460 are then sequentially attracted and repulsed by stator case frame 106 mounted electromagnetic elements 400 to drive rotor stage 300, as previously disclosed.

Figure 8:
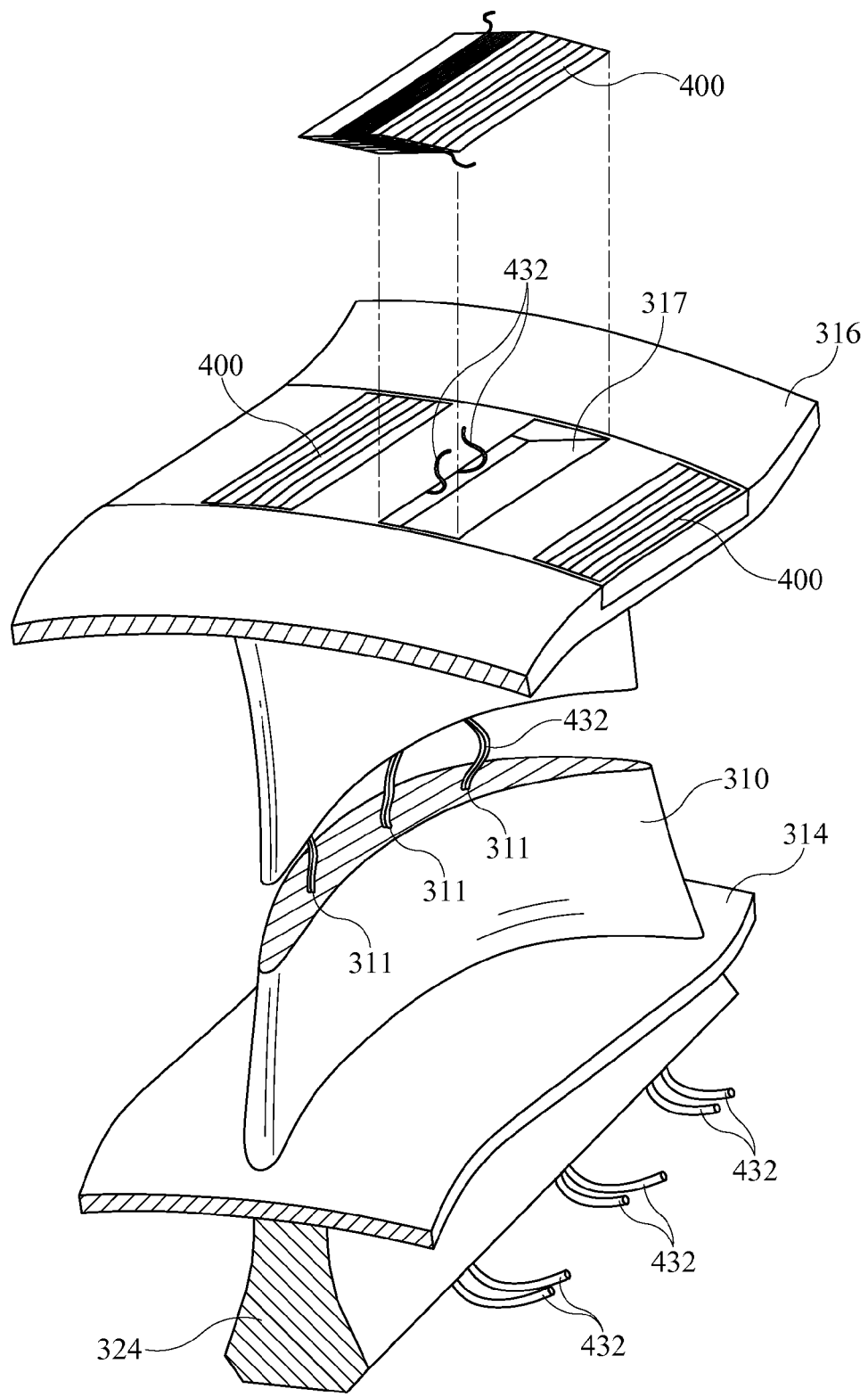
FIG. 8 is a perspective partial cross-sectional view of an electromagnetic rotor blade in accordance with an embodiment of the present invention.

In another embodiment of the present invention, FIG. 8 depicts a rotor blade 310 comprising a tip shroud 316 having a plurality of recesses 317 disposed therein for enclosing a plurality of electromagnetic elements 400 proximate the radially outermost portion of blade 310. Leads 432 of electromagnetic elements 400 are routed internally through blade 310 in individual passageways 311 in blade 310, exiting through dovetail 324 before being routed to controller 220. These shroud 316 mounted electromagnetic elements 400 provide for consistent and close electromagnetic interaction with a corresponding plurality of stator case frame 106 mounted electromagnetic elements 400, thereby providing the requisite motive force to operate motor 10.

Figure 9:
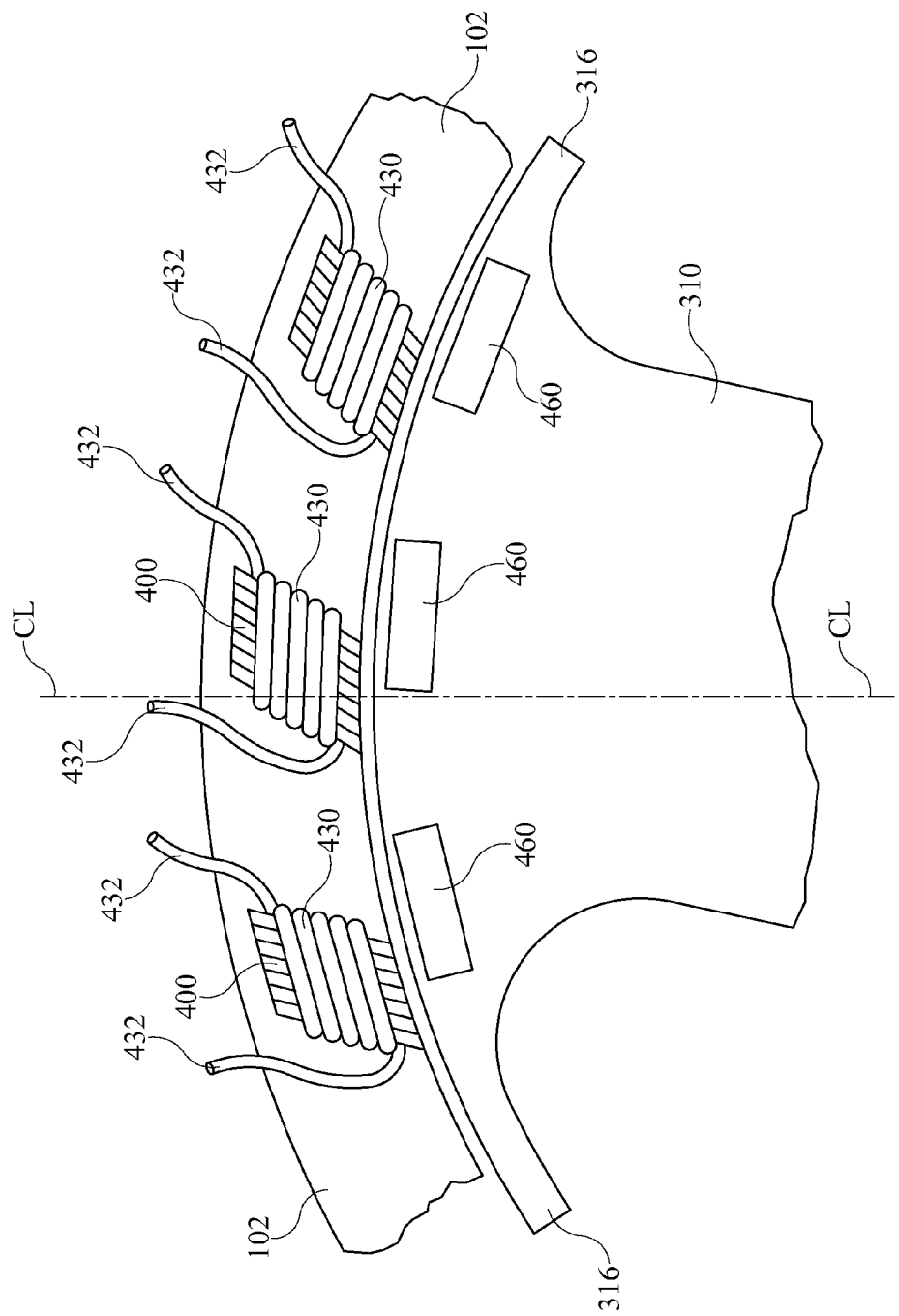
FIG. 9 is a partial cross-sectional view of a rotor blade, blade shroud and stator case in accordance with an embodiment of the present invention.

FIG. 9 depicts a yet further embodiment of the a rotor blade 310 and stator cowl 102 arrangement, wherein shroud 316 encased permanent magnetic elements 460 are driven by a plurality electromagnetic elements 400, for example plate electromagnets, that are disposed at an angle with respect to a radial centerline CL of motor 10, thereby permitting electromagnetic elements 400 to have a stronger field interaction when blade 310 is approaching electromagnetic elements 400, than when blade 310 is moving away from electromagnetic elements 400. Thus this embodiment of the invention will provide for enhanced repulsion (or attraction) between magnetic elements 460 and electromagnetic elements 400, depending upon the polarity of the field created by electromagnetic elements 400 as desired for operation of motor 10.

Figure 10:
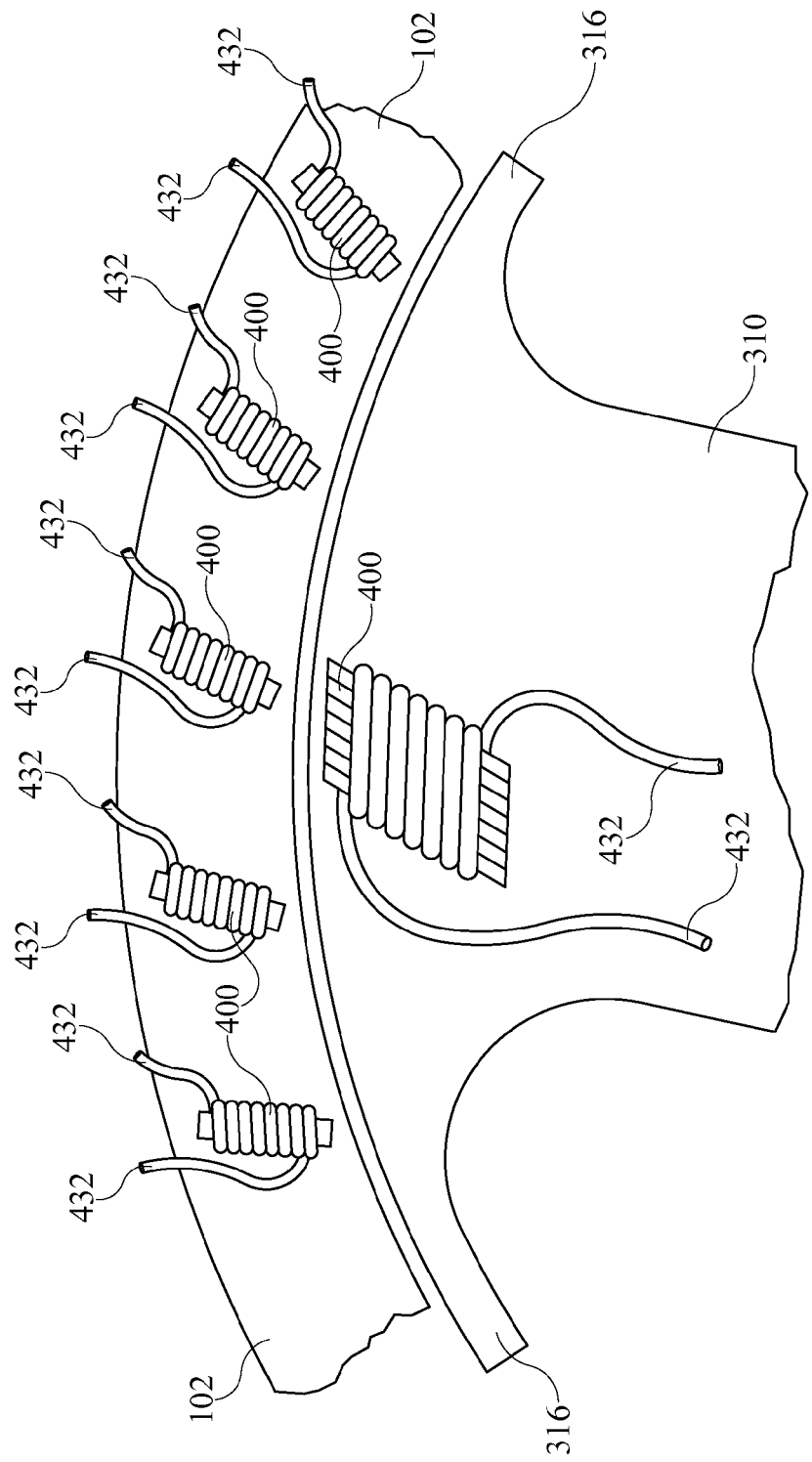
FIG. 10 is a partial cross-sectional view of a rotor blade, blade shroud and stator case in accordance with an embodiment of the present invention.

Similarly, FIG. 10 depicts an exemplary non-limiting embodiment of a plurality of electromagnetic elements 400 mounted in a rotor blade 310 and stator case frame 106. In this embodiment of the present invention stator case frame 102 houses a plurality of rod-style electromagnetic elements 400, angled from a radial centerline CL of motor 10, while blade 310 encases a single electromagnetic element 400, also disposed at an angle relative to radial centerline CL. Shroud 316 mounted electromagnetic element 400 is positioned such that a single pole thereof interacts (either attracts or repulses) with each of the plurality of case frame 106 mounted electromagnetic elements 400 sequentially. By timing the electromagnetic field generation of each electromagnetic element 400 through operation of controller 220, rotor blade 310 is driven by each sequential field produced by each electromagnetic element 400, thereby operating motor 10.

Figure 11:
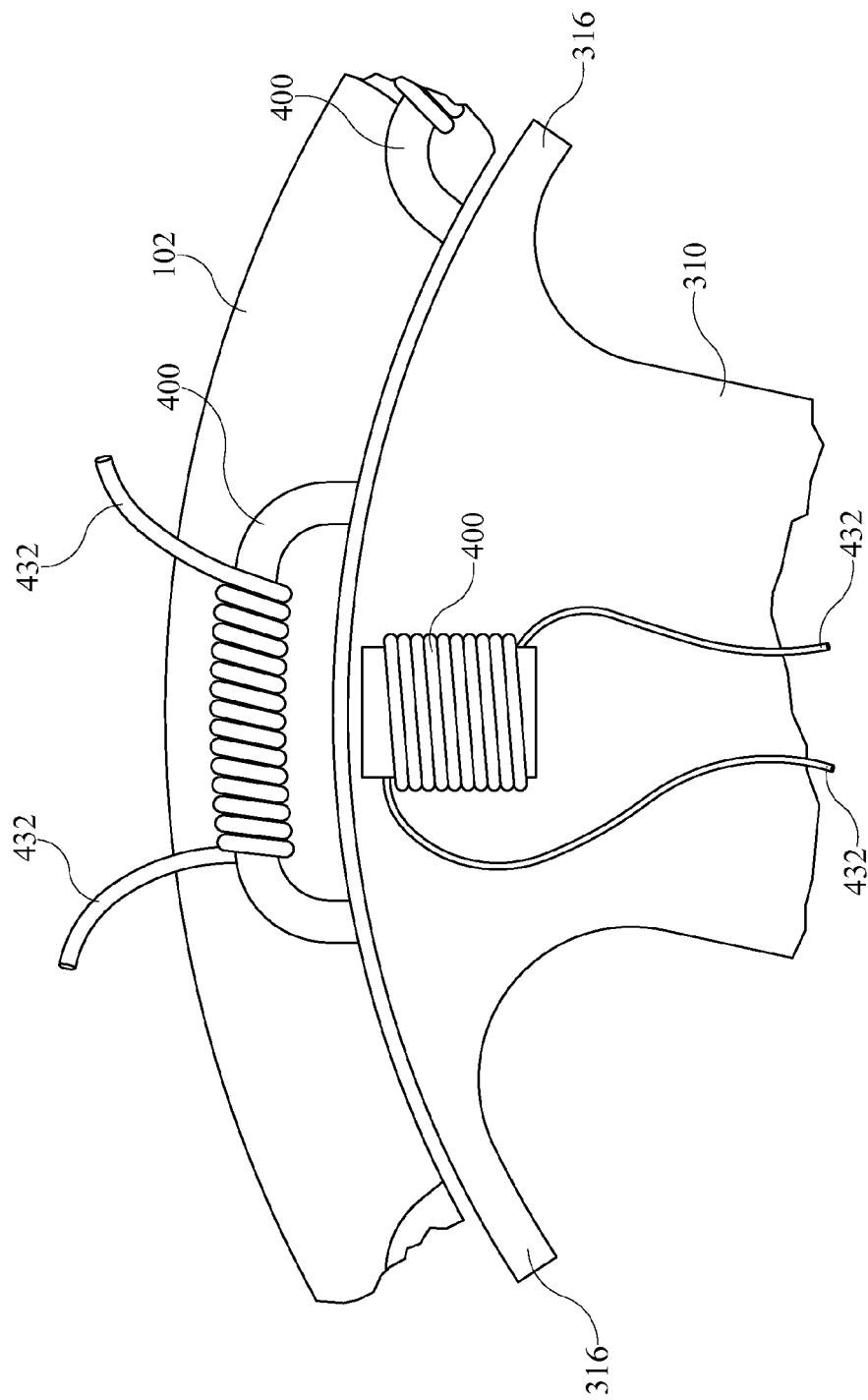
FIG. 11 is a partial cross-sectional view of a rotor blade, blade shroud and stator case in accordance with an embodiment of the present invention.

FIG. 11 depicts a further exemplary non-limiting embodiment of the invention wherein stator case frame 106 houses a plurality of "horseshoe"-type electromagnetic elements 400 that interact with a shroud 316 mounted electromagnetic element 400 earlier disclosed in FIG. 8. In this embodiment of the invention the stator 100 electromagnetic elements 400 have one end or pole that repulses rotor blade 310 electromagnetic element 400 as the opposite end or pole attracts said electromagnetic element 400. Once blade 310 rotates to a point where the two electromagnetic elements 400 are strongly attracted to each other controller 220 then reverses the field of one of the elements 400, thereby providing a repulsing force between electromagnetic elements 400 and causing rotation of rotor stage 300.

Figure 12:
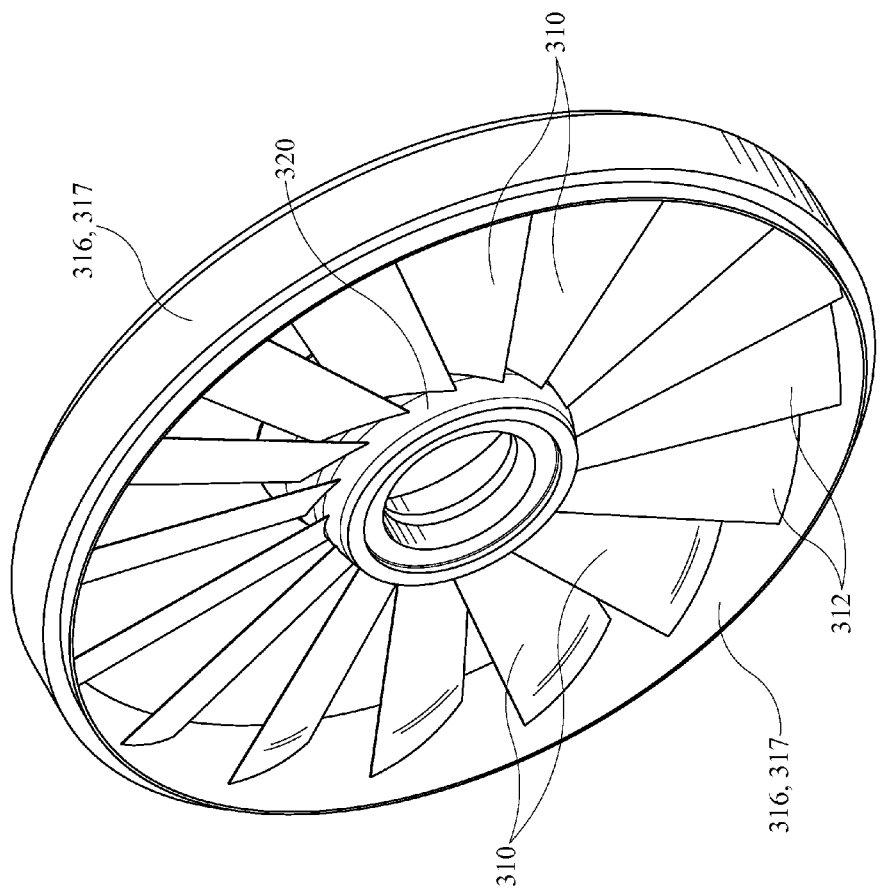
FIG. 12 is a perspective view of a monolithic rotor assembly in accordance with an embodiment of the present invention.

Referring now to FIG. 12, and in accordance with another exemplary embodiment of the instant invention, a monolithic rotor stage 300 may be utilized wherein rotor wheel 320, radially extending rotor blades 310, and blade tip 312 shrouds 316 are all comprised of a single piece of material, for example a machined titanium alloy, or one of a plurality of suitable composite materials, carbon fibers, ceramic fibers, Kevlar, or fiberglass materials. In this embodiment of the invention shrouds 316 are formed together in one continuous and integral generally annular hoop 317 that defines the outer circumference of rotor stage 300. Rotor blades 310 terminate at their tips 312 in hoop 317, while they terminate at their radially inward end into rotor wheel 320.

When monolithic rotor stage 300 is employed in an embodiment of the invention, rotor blades 310 may further be constructed having tip 312 encased permanent magnetic elements 460 disposed therein, or alternatively having electromagnetic elements 400 disposed therein. Monolithic rotor stage 300 provides for a motor 10 assembly that is much simpler than prior art motor designs, thereby reducing cost in manufacturing and assembly.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. An electromagnetic propulsive motor having a rotor capable of rotation around a shaft, said rotor having a plurality of radially disposed blades for compressing a fluid having blade tip portions, and a stator having a case frame, and a plurality of radially disposed vanes extending generally between said case frame and said shaft for directing a working fluid, comprising:
    a plurality of electromagnetic elements disposed within said rotor blades proximate the tip portions thereof;
    a plurality of electromagnetic elements disposed in said stator case frame, radially outwardly of said rotor blades, whereby said electromagnetic elements of said blades and said electromagnetic elements disposed in said stator case housing electromagnetically interact to drive said rotor;
    a rotor wheel that is rotatable around said shaft for mounting a one of said rotor blades, said rotor wheel having a plurality of electromagnetic elements secured thereto; and
    a plurality of electromagnetic elements disposed on said shaft proximate said rotor wheel, whereby electromagnetic elements on said rotor wheel and on said shaft electromagnetically interact to drive said rotor.

2. An electromagnetic propulsive motor as claimed in claim 1 comprising:
    a plurality of housings having at least one electromagnetic element therein disposed in said stator case radially outwardly of said rotor blade tips, whereby said electromagnetic elements of said rotor blades and said electromagnetic elements in said housings interact to drive said rotor.

3. An electromagnetic propulsive motor as claimed in claim 1 wherein said electromagnetic elements comprise a magnetic core and an electrically conductive winding around a portion thereof.

4. An electromagnetic propulsive motor as claimed in claim 3 comprising:
    a controller having a plurality of inputs and outputs, said outputs operatively connected to said windings of said electromagnetic elements for providing an electrical signal thereto, thereby producing an electromagnetic field in said elements.

5. An electromagnetic propulsive motor as claimed in claim 1 comprising:
    a stator case frame housing for encasing a plurality of electromagnetic elements radially outwardly from said rotor blades.

6. An electromagnetic propulsive motor as claimed in claim 1 comprising:
    an aft electromagnetic drive housing; and
    a plurality of electromagnetic elements positioned within said aft drive housing, wherein said aft drive housing is proximate the radially outward point of said rotor blades, and wherein said aft drive housing electromagnetic elements interact with said rotor blade electromagnetic elements.

7. An electromagnetic propulsive motor as claimed in claim 1 having a bypass fan stage forward of said stator, and having a bypass duct disposed circumferentially around said fan stage and a fan shaft having a hub rotatable around said shaft comprising:
    a plurality of fan blades extending radially between said hub at an inner end and said bypass duct at a tip end, and capable of rotation with said hub; and
    an outer electromagnetic drive for rotating said fan blades.

8. An electromagnetic propulsive motor as claimed in claim 7 comprising:
    an inner electromagnetic drive for rotating said fan blades.

9. An electromagnetic propulsive motor as claimed in claim 7 wherein said outer electromagnetic drive comprises:
    a plurality of electromagnetic elements encased within said fan blades proximate said tip portions thereof; and
    a plurality of electromagnetic elements disposed within said bypass duct whereby said fan blade electromagnetic elements and said bypass duct electromagnetic elements interact electromagnetically as said fan blades rotate.

10. An electromagnetic propulsive motor as claimed in claim 1 comprising:
    a monolithic rotor formed of a single piece of material having a rotor wheel journaled for rotation around said shaft, wherein said monolithic rotor comprises said rotor wheel, said rotor blades, and an annular rotor hoop extending around an external circumference of said rotor.

11. An electromagnetic propulsive motor for directing and compressing a working fluid, comprising:
    a central axial shaft having a plurality of electromagnetic elements disposed thereon;

a stator having a stator case and a case frame spaced circumferentially outwardly from said shaft, at least one hub secured to said shaft, and a plurality of vanes extending between said stator case frame and said at least one hub for directing said working fluid, and a plurality of electromagnetic elements disposed in said stator case frame; and a plurality of rotor stages capable of rotation around said shaft, each of said stages comprising a plurality of electromagnetic elements positioned to electromagnetically interact with said electromagnetic elements disposed in said stator case frame and on said central axial shaft.

12. An electromagnetic propulsive motor as claimed in claim 11 wherein said plurality of rotor stages each comprises:

a rotor wheel capable of rotation around said shaft;

a plurality of rotor blades secured to said rotor wheel and extending radially outwardly towards said stator case frame, each of said rotor blades having a tip portion; and wherein said electromagnetic elements are encased within said rotor blade tip portions.

13. An electromagnetic propulsive motor as claimed in claim 12 wherein said plurality of rotor blades each comprises a tip shroud encasing an electromagnetic element.

14. An electromagnetic propulsive motor having a rotor capable of rotation around a shaft, said rotor having a plurality of radially disposed blades for compressing a fluid having blade tip portions, and a stator having a case frame, and a plurality of radially disposed vanes extending generally between said case frame and said shaft for directing a working fluid, comprising:

a plurality of radially disposed fixed vanes fixedly secured between said case frame and said shaft for transmitting forces acting on said motor;

a plurality of electromagnetic elements disposed within said rotor blades proximate the tip portions thereof; and a plurality of electromagnetic elements disposed in said stator case frame, radially outwardly of said rotor blades, whereby said electromagnetic elements of said blades and said electromagnetic elements disposed in said stator case housing electromagnetically interact to drive said rotor.

15. An electromagnetic propulsive motor as claimed in claim 14 further comprising:

a plurality of radially disposed variable vanes fixedly secured between said case frame and said shaft for transmitting forces acting on said motor.

* * * * *